Aug. 22, 1933.  H. FLEISCHMANN  1,924,066
CORRIDOR TRAP NEST
Filed June 25, 1932

Inventor:
Hans Fleischmann

Patented Aug. 22, 1933

1,924,066

UNITED STATES PATENT OFFICE 1,924,066

CORRIDOR TRAP NEST

Hans Fleischmann, Schwabach, Germany

Application June 25, 1932, Serial No. 619,301, and in Germany February 7, 1931

2 Claims. (Cl. 119—47)

My invention has for its object an automatic corridor trap nest in which, as hitherto known, behind the entering hen the entrance flap door closes, the releasing of the exit flap door is effected by the rolling down of the egg and the entrance flap door is again unlocked when the hen leaves the nest. As further known, the nest is rigidly positioned and provided with a tilting bottom plate member which is opened by the laid egg to drop through.

According to my invention, the tilting bottom plate member is supported in such a manner, that it is held in closed position until the hen leaving the nest has trodden down a movable tread board situated before the exit flap door. By this movement the tilting bottom plate member is released with the effect that the egg being up to now on the bottom plate member rolls down over the open bottom plate member and causes, as hitherto known, the releasing of the exit flap door.

Owing to the circumstance that the tilting plate member is held in closed position as long as the hen is in the nest, the hen will be prevented from treading into the trap opening and becoming hurt or from releasing herself from the cage.

Not before the hen has left the nest, but is still within the case, the releasing of the tilting bottom plate member is automatically effected by the hen herself.

The combined working of the egg's weight during the operation of the whole device is limited to the turning of the tilting bottom plate member and a tilting cover which releases the hook latch of the exit flap door, i. e. all motions of the levers are executed by means of elements of light construction, while all other motions are caused by the hen on her way from the nestbody to the tread board. The weight of the hen is only used for the treading down of the board which serves to turn down the supporting lever of the bottom plate member.

The accompanying drawing shows by way of example my invention in which

Figure 3:
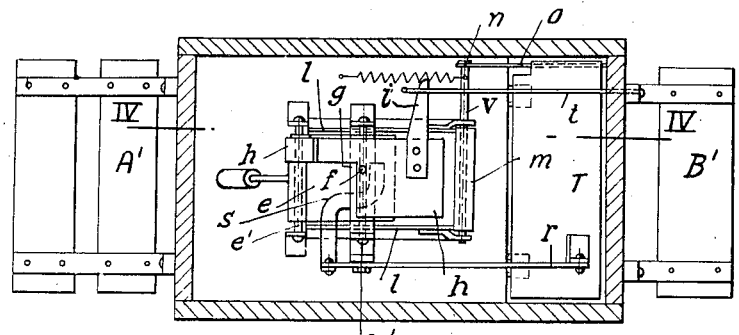
Fig. 3 is a view from underside with removed bottom.
Figure 1:
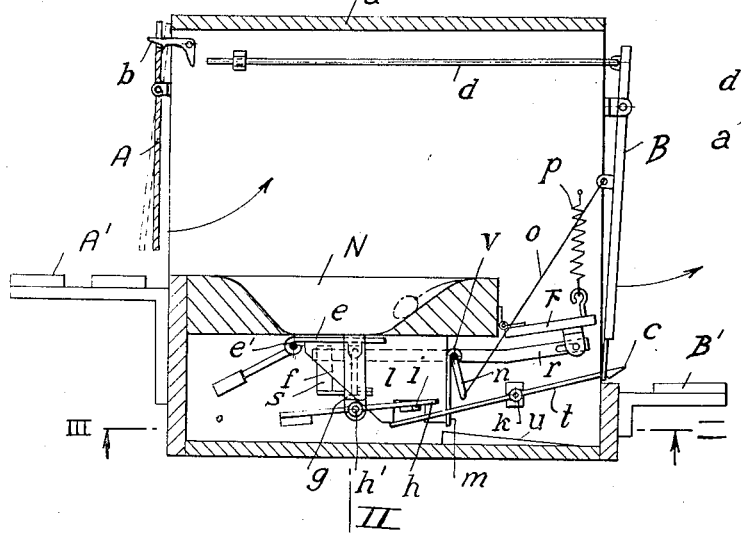
Fig. 1 is a vertical longitudinal section.
Figure 2:
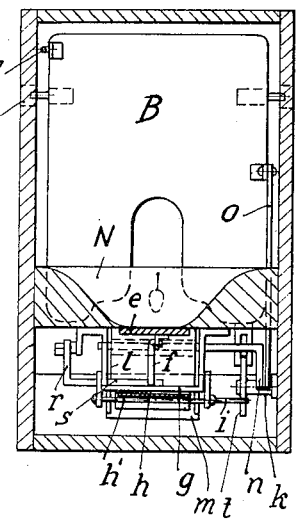
Fig. 2 is a vertical cross section.

The corridor trap nest consists of a case $a$ open at both ends which is provided on the one side with the entrance flap door A and with a tread platform A', while on the other side is the exit flap door B and a further tread platform B'. Within the case $a$ the nestbody N is fixed and fitted with a trap opening for the egg. The flap doors A and B are locked by means of hook latches $b$ and $c$ respectively. The hook latch $b$ is shaped as a bell crank lever and cooperates with a push rod $d$ which is jointly connected to the exit flap door B. The bell crank lever occupies owing to its gravity the position as shown in Fig. 1 and after the hen has entered the trap nest through the entrance flap door A the latter swings back and is held in position as shown by dotted lines in Fig. 1, where it is locked. Underneath the trap opening of the nest a tilting bottom plate member $e$ is turnably arranged about an axle $e'$ balanced by a counter-weight, said tilting plate member covering the trap opening when not in use (Fig. 1). On the underside of the tilting plate member $e$ a one-armed lever $f$ is adapted, which rests with its free end upon a rigid support member $g$ and keeps the tilting plate member $e$ in its closed position. In a certain distance below said tilting bottom plate member a further tilting plate member $h$ is journaled about an axle $h'$ which carries a lateral projecting arm $i$ actuating a double-armed lever $t$. The latter is journaled at $k$ on the case wall and carries the hook latch $c$ for the exit flap door B. On both sides of the tilting plate member $e$ vertical walls $l$ are provided against the front sides of which directed towards the exit flap door a tilting cover $m$ rests under the action of a spring. The walls $l$ and flaps $h$ and $m$ form a receiving space for the egg coming from the nest. The axle $v$ of the flap $m$ is constructed as a crank $n$ from which a connecting rod $o$ leads to the exit flap door B. Between the nestbody N and the exit flap door is a tread board T pivotally connected with the nestbody and raised by aid of a tension spring $p$. Said tread board T engages on its underside with a rod $r$ by means of a slot joint which coacts with a projecting arm $s$ and the one-armed lever $f$.

Figure 4:
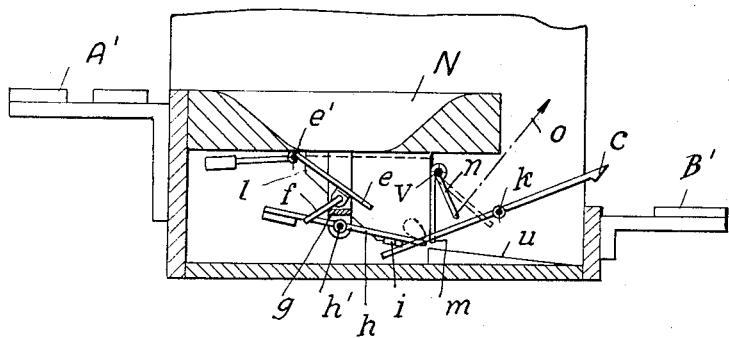
Fig. 4 is a partly taken section on line IV—IV according to Fig. 3.

The operation of the corridor trap nest is as follows:

In the beginning the described and illustrated parts have the position shown in Fig. 1. The hen coming from the tread platform A' enters the nest through the unlatched entrance flap door A, whereby the flap door swings in the direction of the arrow. After the hen has passed the flap door A swings back by its own weight and is locked by the hook latch $b$. As the exit flap door B is also latched the hen is locked into the case. After the egg has been laid it remains for the moment on the tilting bottom plate member e which covers the trap opening and is held by the lever f. The hen wishing to leave the case a treads onto the board T which is moved downwards by her weight against the action of the spring p. Owing to the motion of the tread board T the rod r is pushed and the arm s of the latter pushes out the lever f. Now the tilting plate member e has lost its support and can swing downwards, since the egg being upon it acts by its weight as shown in Fig. 4. The egg rolls from the inclined tilting bottom plate member e onto the second tilting plate member h, whereby the latter is moved from the position according to Fig. 1 into that as indicated by Fig. 4. Simultaneously the lateral projecting arm i of the tilting plate member h bears against the double-armed lever t and turns the latter about its axle k with the effect that the hook latch c releases the exit flap door B. The egg now occupies the space between the walls l on the tilting plate member h and rests against the tilting cover m (Fig. 4).

The hen passing on, opens the unlocked door B which swings outwards according to the direction of the arrow (Fig. 1). By this motion the tilting cover m is turned by means of the connecting rod o engaging with the crank n into the position shown in Fig. 4 by dotted lines, so that the egg rolls from the tilting plate member h over an inclined way u into the collecting space. Owing to the swinging out of the exit flap door B the rod d is pushed in such a manner, that it presses against the bell crank lever b and releases the entrance flap door A. Behind the passing out hen the flap door B swings back and is locked again by the hook latch c. The tilting plate member e has reached its original position and the lever f takes up the illustrated position by the action of its own weight (Fig. 1). The case is now in readiness for the entrance of the next hen and the described operations are repeated in the same manner.

What I claim is:

1. A corridor trap nest having an entrance flap door and an exit and a nest body having a trap opening, comprising in combination, a tilting bottom plate member journaled below said trap opening, a one-armed lever connected loosely to the underside of said tilting bottom plate member, a rigid support member attached to the underside of said nest body in position to receive the free end of said one-armed lever, a tread board pivotally secured to the end of the nest body and extending towards the exit flap door, a tension spring adapted to raise said tread board, a pivotally mounted rod attached at one end to the underside of said tread board and a projecting arm connected to the other end of said rod and positioned to engage with the free end of said one-armed lever when said tread board is depressed.

2. A corridor trap nest having an entrance flap door and an exit and a nest body having a trap opening, comprising in combination, a tilting bottom plate member journaled below said trap opening, a rigid support member attached to the underside of said nestbody, a second tilting plate member journaled in said support at a certain distance below said tilting bottom plate member, a lateral projecting arm carried by said second tilting plate member, a double-armed lever journaled movably within the trap case and adapted to be actuated by said lateral projecting arm, a hook latch provided on the opposite end of said double-armed lever and adapted to engage the exit flap door, vertical walls mounted on both sides of said tilting bottom plate member, a tilting cover hinged to the front sides of said vertical walls, an axle supported by said vertical walls and adapted to carry said tilting cover, a crank formed on the end of said axle, a rod connecting said crank with the exit flap door, a push rod connected to the exit flap door and guided in the trap case so as to project towards the entrance flap door, a hook latch shaped as a bell crank lever and positioned to coact at one arm with said push rod and at the other arm with said entrance flap door.

HANS FLEISCHMANN.